United States Patent
Screen

(10) Patent No.: US 6,267,504 B1
(45) Date of Patent: Jul. 31, 2001

(54) LEAVES COLLECTION AND RETAINING DEVICE

(76) Inventor: Christopher A. Screen, 859 Seaman Ave., Baldwin, NY (US) 11510

(*) Notice: Subject to any disclaimer, the term of this patent is extended or adjusted under 35 U.S.C. 154(b) by 0 days.

(21) Appl. No.: 09/586,360
(22) Filed: Jun. 2, 2000
(51) Int. Cl.$^7$ ................................................. B65D 30/06
(52) U.S. Cl. .................................. 383/4; 383/71; 383/117
(58) Field of Search ........................... 383/4, 37, 71, 383/117, 127; D34/1, 4; D3/20

(56) References Cited

U.S. PATENT DOCUMENTS

| | | | |
|---|---|---|---|
| D. 327,345 | * 6/1992 | Lammon et al. | 383/4 X |
| D. 349,593 | 8/1994 | Hensley . | |
| 1,871,101 | * 8/1932 | Waltz | 383/4 X |
| 2,749,957 | * 6/1956 | Smith | 383/4 X |
| 2,766,797 | * 10/1956 | Cowen | 383/4 X |
| 3,202,193 | * 8/1965 | Ware | 383/4 X |
| 4,366,949 | 1/1983 | Staub, Sr. . | |
| 4,499,133 | * 2/1985 | Prince | 383/4 X |
| 4,519,183 | * 5/1985 | Parody | 383/4 X |
| 4,620,396 | * 11/1986 | Bjorntwedt | 383/4 X |
| 4,955,068 | 9/1990 | Tennihan . | |
| 5,003,655 | 4/1991 | Kafai . | |
| 5,364,188 | * 11/1994 | Godfried et al. | 383/4 |
| 5,417,462 | 5/1995 | Hensley . | |
| 5,524,423 | * 6/1996 | Haley | 383/4 X |
| 5,579,610 | 12/1996 | Jackson . | |

* cited by examiner

Primary Examiner—Jes F. Pascua

(57) ABSTRACT

A leaves collection and retaining device for conveniently collecting leaves falling from a tree. The leaves collection and retaining device includes one or more net members each having corners and having a border portion and being fastenable to other net members; and also includes a plurality of fastening members securely attached to a side of each net member for securely fastening to other net members; and further includes a plurality of flexible elongate members securely attached to each net member and being adapted to fasten sides and ends of each net member together thus forming a bag for carrying leaves collected on the net member.

14 Claims, 2 Drawing Sheets

LEAVES COLLECTION AND RETAINING DEVICE

BACKGROUND OF THE INVENTION

1. Field of the Invention

The present invention relates to a screen net and more particularly pertains to a new leaves collection and retaining device for conveniently collecting leaves falling from a tree.

2. Description of the Prior Art

The use of a screen net is known in the prior art. More specifically, a screen net heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,579,610; U.S. Pat. No. 4,366,949; U.S. Pat. No. 5,417,462; U.S. Pat. No. 4,955,068; U.S. Pat. No. 5,003,655; and U.S. Pat. No. Des. 349,593.

While these devices fulfill their respective, particular objectives and requirements, the aforementioned patents do not disclose a new leaves collection and retaining device. The inventive device includes one or more net members each having corners and having a border portion and being fastenable to other net members; and also includes a plurality of fastening members securely attached to a side of each net member for securely fastening to other net members; and further includes a plurality of flexible elongate members securely attached to each net member and being adapted to fasten sides and ends of each net member together thus forming a bag for carrying leaves collected on the net member.

In these respects, the leaves collection and retaining device according to the present invention substantially departs from the conventional concepts and designs of the prior art, and in so doing provides an apparatus primarily developed for the purpose of conveniently collecting leaves falling from a tree.

SUMMARY OF THE INVENTION

In view of the foregoing disadvantages inherent in the known types of screen net now present in the prior art, the present invention provides a new leaves collection and retaining device construction wherein the same can be utilized for conveniently collecting leaves falling from a tree.

The general purpose of the present invention, which will be described subsequently in greater detail, is to provide a new leaves collection and retaining device which has many of the advantages of the screen net mentioned heretofore and many novel features that result in a new leaves collection and retaining device which is not anticipated, rendered obvious, suggested, or even implied by any of the prior art screen net, either alone or in any combination thereof.

To attain this, the present invention generally comprises one or more net members each having corners and having a border portion and being fastenable to other net members; and also includes a plurality of fastening members securely attached to a side of each net member for securely fastening to other net members; and further includes a plurality of flexible elongate members securely attached to each net member and being adapted to fasten sides and ends of each net member together thus forming a bag for carrying leaves collected on the net member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new leaves collection and retaining device which has many of the advantages of the screen net mentioned heretofore and many novel features that result in a new leaves collection and retaining device which is not anticipated, rendered obvious, suggested, or even implied by any of the prior art screen net, either alone or in any combination thereof.

It is another object of the present invention to provide a new leaves collection and retaining device which may be easily and efficiently manufactured and marketed.

It is a further object of the present invention to provide a new leaves collection and retaining device which is of a durable and reliable construction.

An even further object of the present invention is to provide a new leaves collection and retaining device which is susceptible of a low cost of manufacture with regard to both materials and labor, and which accordingly is then susceptible of low prices of sale to the consuming public, thereby making such leaves collection and retaining device economically available to the buying public.

Still yet another object of the present invention is to provide a new leaves collection and retaining device which provides in the apparatuses and methods of the prior art some of the advantages thereof, while simultaneously overcoming some of the disadvantages normally associated therewith.

Still another object of the present invention is to provide a new leaves collection and retaining device for conveniently collecting leaves falling from a tree.

Yet another object of the present invention is to provide a new leaves collection and retaining device which includes one or more net members each having corners and having a border portion and being fastenable to other net members; and also includes a plurality of fastening members securely attached to a side of each net member for securely fastening to other net members; and further includes a plurality of flexible elongate members securely attached to each net member and being adapted to fasten sides and ends of each net member together thus forming a bag for carrying leaves collected on the net member.

Still yet another object of the present invention is to provide a new leaves collection and retaining device that substantially saves the user time from not having to rake up the leaves falling from the trees.

Even still another object of the present invention is to provide a new leaves collection and retaining device that does not detract from the appearance around the tree and allows water to get through the net member to the root of the tree.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
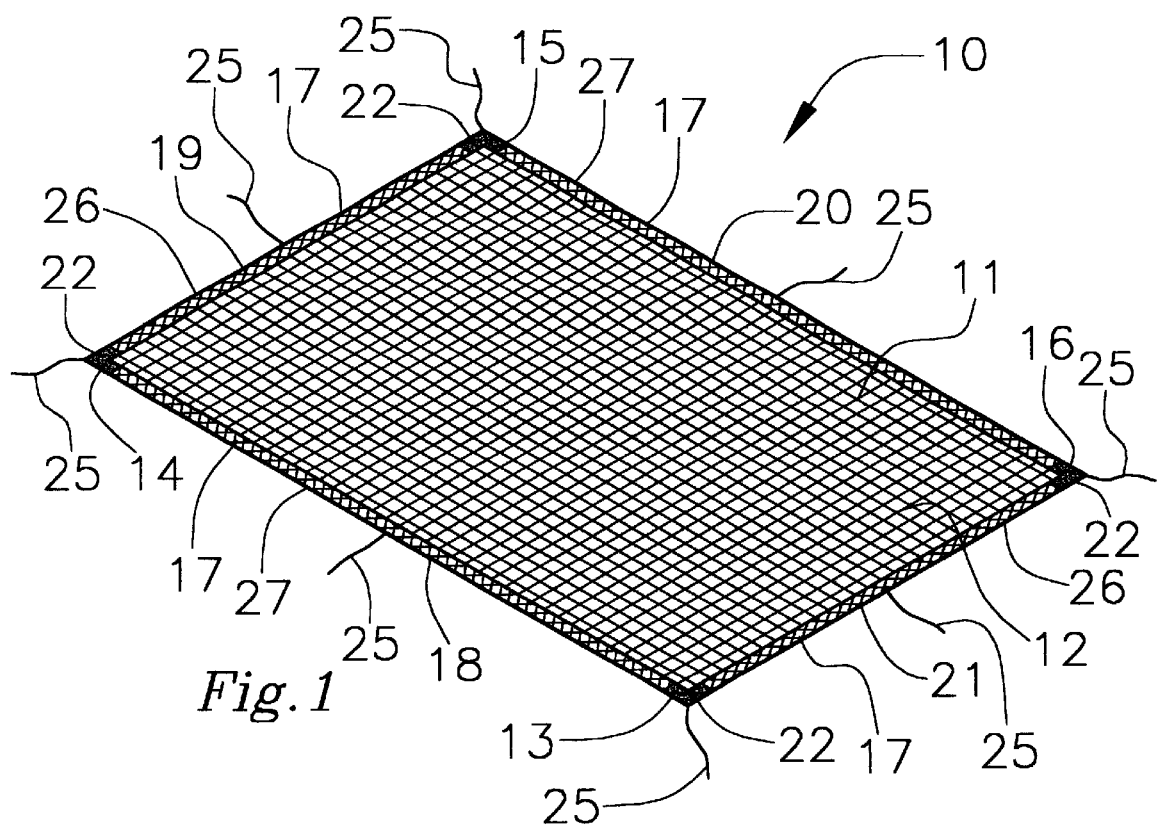
FIG. 1 is a perspective view of a new leaves collection and retaining device according to the present invention.
Figure 2:
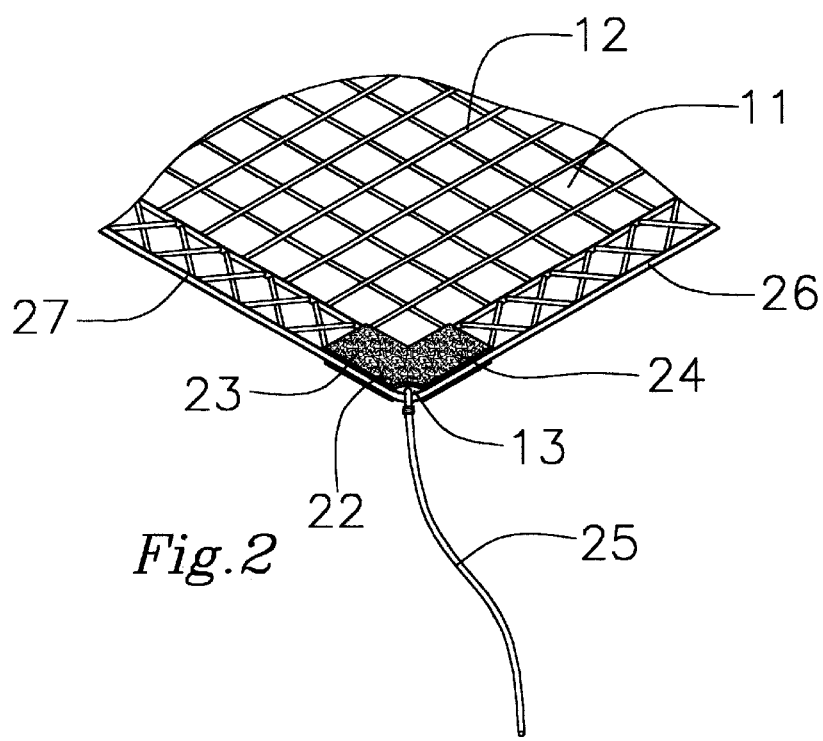
FIG. 2 is a detailed perspective view of one corner of the present invention.
Figure 3:
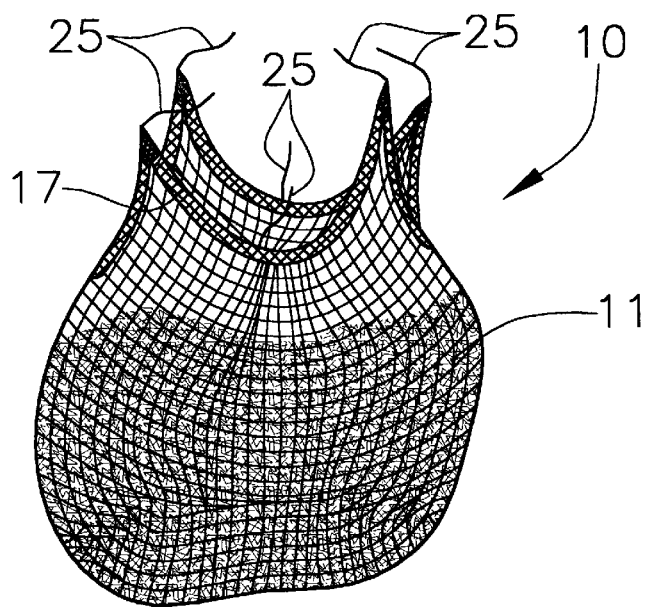
FIG. 3 is a perspective view of the present invention being formed into a disposable bag.
Figure 4:
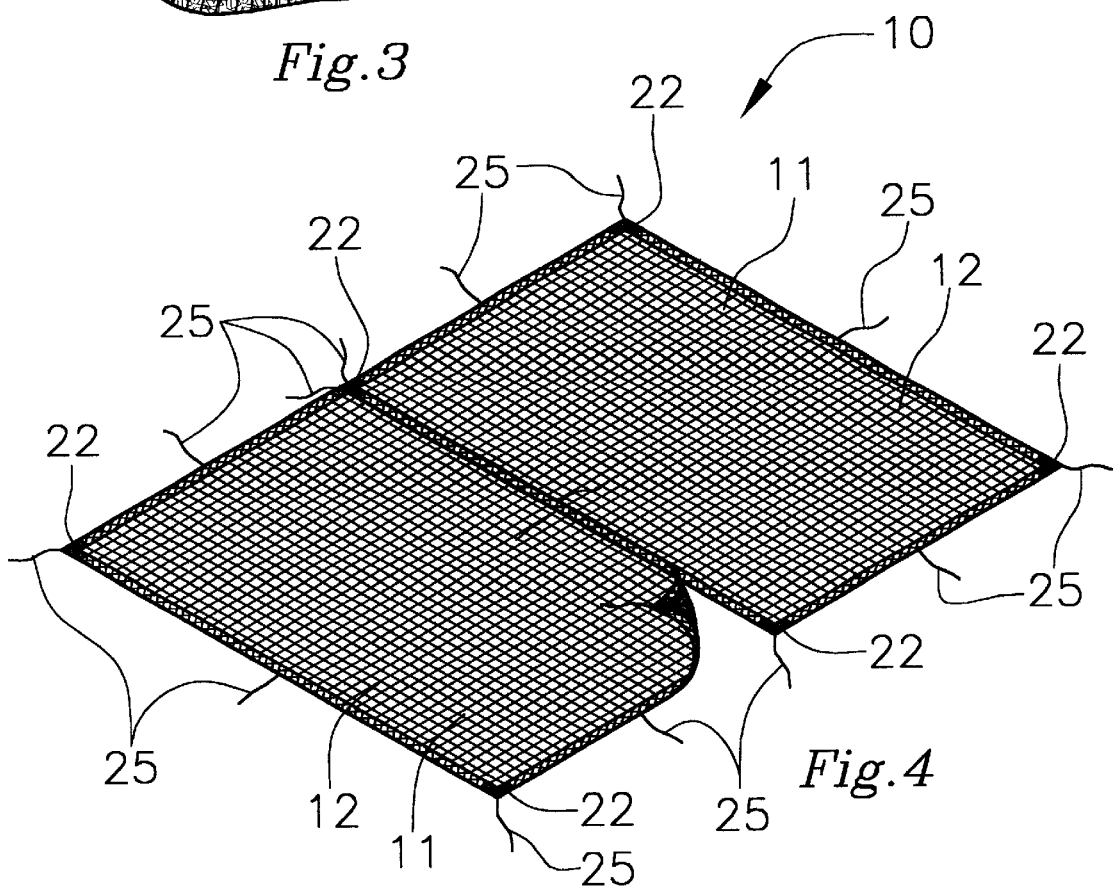
FIG. 4 is a perspective view of two net members of the present invention being fastened together.

With reference now to the drawings, and in particular to FIGS. 1 through 4 thereof, a new leaves collection and retaining device embodying the principles and concepts of the present invention and generally designated by the reference numeral 10 will be described.

As best illustrated in FIGS. 1 through 4, the leaves collection and retaining device 10 generally comprises one or more net members 11 each having corners 13–16 and having a border portion 17 and being fastenable to other net members 11. Each net member 11 is essentially rectangular and is made of raffia-fiber. Also, each net member 11 has a length of approximately 8 feet and a width ranging from 4 to 8 feet and is adapted to be placed upon a lawn under a tree in order to collect and retain fallen leaves from the tree.

A plurality of fastening members 22 are securely and conventionally attached and sewn to a side 12 of each net member 11 for securely fastening to other net members 11. The fastening members 22 include strips of hook and loop fasteners with each of the strips of hook and loop fasteners being securely attached at a respective corner 13–16 of the net member 11. Each of the strips 22 of hook and loop fasteners includes a first portion 23 and a second portion 24 which is angled relative to the first portion 23. The first and second portions 23,24 extend upon and along a portion of the border portion 17 of the net member 11.

A plurality of flexible elongate members 25 are securely and conventionally attached to each net member 11 and are adapted to fasten side edges 27 and end edges 26 of each net member 11 together thus forming a bag for carrying leaves collected on the net member 11. The flexible elongate members 25 are essentially strings which are securely attached to and looped about the border portion 17. Each of the corners 13–16 has a respective string 25 securely attached thereto and each intermediate portion 18–21 between a pair of corners 13–16 includes a respective string 25 securely attached thereto for securely fastening the end edges 26 and side edges 27 of the net member 11 together thus forming the bag.

In use, the user preferably places the net member 11 below a tree in order to collect the leaves that fall from the tree. Additional, net members 11 can be fastened together to cover a larger area beneath a larger tree. Once the net member 11 or net members are filled with leaves, the user can tie the strings 25 together to essentially form a disposable biodegradable bag of which can be easily disposed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A leaves collection and retaining device comprising:
    one or more net members each having corners and having a border portion and being fastenable to other said net members;
    a plurality of fastening members securely attached to a side of each said net member for securely fastening to other said net members;
    a plurality of flexible elongate members securely attached to each said net member and being adapted to fasten side edges and end edges of each said net member together thus forming a bag for carrying leaves collected on said net member;
    wherein each said net member is essentially rectangular and is made of raffia-fiber; and
    wherein said fastening members include strips of hook and loop fasteners.

2. A leaves collection and retaining device as described in claim 1 wherein each of said strips of hook and loop fasteners is securely attached at a respective said corner of said net member.

3. A leaves collection and retaining device as described in claim 2, wherein each of said strips of hook and loop fasteners includes a first portion and a second portion which is angled relative to said first portion, said first and second portions extending upon and along a portion of said border portion of said net member.

4. A leaves collection and retaining device as described in claim 3, wherein said flexible elongate members are essentially strings.

5. A leaves collection and retaining device as described in claim 4, wherein said strings are securely attached to said border portion, each of said corners has a respective said string securely attached thereto and each intermediate portion between a pair of said corners includes a respective said string securely attached thereto for securely fastening said end edges and side edges of said net member together thus forming said bag.

6. A leaves collection and retaining device as described in claim 1, wherein each said net member has a length of approximately 8 feet and a width ranging from 4 to 8 feet and is adapted to be placed upon a lawn under a tree in order to collect and retain fallen leaves from the tree.

7. A leaves collection and retaining device comprising:

one or more net members each having corners and having a border portion and being fastenable to other said net members;

a plurality of fastening members securely attached to a side of each said net member for securely fastening to other said net members;

a plurality of flexible elongate members securely attached to each said net member and being adapted to fasten side edges and end edges of each said net member together thus forming a bag for carrying leaves collected on said net member; and wherein said fastening members include strips of hook and loop fasteners.

8. A leaves collection and retaining device as described in claim 7, wherein each said net member is essentially rectangular and is made of raffia-fiber.

9. A leaves collection and retaining device as described in claim 7, wherein each of said strips of hook and loop fasteners is securely attached at a respective said corner of said net member.

10. A leaves collection and retaining device as described in claim 7, wherein each of said strips of hook and loop fasteners includes a first portion and a second portion which is angled relative to said first portion, said first and second portions extending upon and along a portion of said border portion of said net member.

11. A leaves collection and retaining device as described in claim 7, wherein said flexible elongate members are essentially strings.

12. A leaves collection and retaining device as described in claim 11, wherein said strings are securely attached to said border portion, each of said corners has a respective said string securely attached thereto and each intermediate portion between a pair of said corners includes a respective said string securely attached thereto for securely fastening said end edges and side edges of said net member together thus forming said bag.

13. A leaves collection and retaining device as described in claim 7, wherein each said net member has a length of approximately 8 feet and a width ranging from 4 to 8 feet and is adapted to be placed upon a lawn under a tree in order to collect and retain fallen leaves from the tree.

14. A leaves collection and retaining device comprising:

one or more net members each having corners and having a border portion and being fastenable to other said net members, each said net member being essentially rectangular and being made of raffia-fiber, each said net member having a length of approximately 8 feet and a width ranging from 4 to 8 feet and being adapted to be placed upon a lawn under a tree in order to collect and retain fallen leaves from the tree;

a plurality of fastening members securely attached to a side of each said net member for securely fastening to other said net members, said fastening members including, strips of hook and loop fasteners, each of said strips of hook and loop fasteners being securely attached at a respective said corner of said net member, each of said strips of hook and loop fasteners including a first portion and a second portion which is angled relative to said first portion, said first and second portions extending upon and along a portion of said border portion of said net member; and a plurality of flexible elongate members securely attached to each said net member and being adapted to fasten side edges and end edges of each said net member together thus forming a bag, for carrying leaves collected on said net member, said flexible elongate members being, essentially strings which are securely attached to said border portion, cach of said corners having a respective said string securely attached thereto and each intermediate portion between a pair of said corners including a respective said string securely attached thereto for securely fastening said end edges and side edges of said net member together thus forming said bag.

\* \* \* \* \*